United States Patent
Rey et al.

(10) Patent No.: US 7,522,935 B2
(45) Date of Patent: Apr. 21, 2009

(54) FEEDBACK CONTROL FOR MULTICAST OR BROADCAST SERVICES

(75) Inventors: Jose Rey, Darmstadt (DE); Ivica Rimac, Darmstadt (DE); Rolf Hakenberg, Darmstadt (DE); Ralf Becker, Neu-Isenburg (DE)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/592,586

(22) PCT Filed: Jun. 21, 2005

(86) PCT No.: PCT/EP2005/006711

§ 371 (c)(1),
(2), (4) Date: Jul. 30, 2007

(87) PCT Pub. No.: WO2006/012946

PCT Pub. Date: Feb. 9, 2006

(65) Prior Publication Data

US 2007/0281726 A1    Dec. 6, 2007

(30) Foreign Application Priority Data

Aug. 6, 2004   (EP) .................................. 04018707

(51) Int. Cl.
*H04B 7/00* (2006.01)

(52) U.S. Cl. .................................... 455/522; 455/67.11
(58) Field of Classification Search .................. 455/522
See application file for complete search history.

(56) References Cited

U.S. PATENT DOCUMENTS

| 5,384,777 | A | * | 1/1995 | Ahmadi et al. ............... 370/337 |
| 6,112,323 | A | * | 8/2000 | Meizlik et al. .............. 714/748 |
| 6,381,215 | B1 | * | 4/2002 | Hamilton et al. ............ 370/236 |

(Continued)

FOREIGN PATENT DOCUMENTS

WO        2004040928         5/2004

OTHER PUBLICATIONS

Wu et al., "An End-to-End Approach for Optimal Mode Selection In Internet Video Communciation: Theory And Application", IEEE 2000, pp. 977-995.*

(Continued)

*Primary Examiner*—Duc Nguyen
*Assistant Examiner*—Hai V Nguyen
(74) *Attorney, Agent, or Firm*—Dickinson Wright, PLLC

(57) ABSTRACT

The invention relates to a method for controlling the transmission of feedback of mobile terminals receiving via an air interface of a mobile communication system a multicast or broadcast service transmitted or forwarded by a feedback control entity and to a mobile terminal, the feedback control entity using this method. Further, a communication system comprising a feedback control entity and a mobile terminal receiving a multicast or broadcast service is provided. To enable configurable and adaptive feedback for multicast or broadcast services provided via an air interface maintaining the end-to-end session concept the invention suggests selecting a subset of the mobile terminals of the mobile communication system and which receive the multicast or broadcast service for providing feedback to a feedback control entity. In one embodiment of the invention the terminals may decide whether to provide feedback based on a probabilistic experiment performed based on parameters determined and provided by the feedback control entity.

39 Claims, 7 Drawing Sheets

U.S. PATENT DOCUMENTS

| | | | | |
|---|---|---|---|---|
| 6,392,993 | B1* | 5/2002 | Hamilton et al. | 370/230 |
| 7,079,854 | B2* | 7/2006 | Lee et al. | 455/466 |
| 7,103,772 | B2* | 9/2006 | Jorgensen et al. | 713/168 |
| 7,107,224 | B1* | 9/2006 | Weller et al. | 705/10 |
| 7,148,754 | B2* | 12/2006 | Kaminski | 331/11 |
| 7,224,758 | B1* | 5/2007 | Banister | 375/358 |
| 7,295,568 | B2* | 11/2007 | Kossi et al. | 370/432 |
| 7,331,008 | B2* | 2/2008 | Cheng et al. | 714/748 |
| 7,360,087 | B2* | 4/2008 | Jorgensen et al. | 713/168 |
| 7,376,150 | B2* | 5/2008 | Vedantham et al. | 370/469 |
| 2003/0001605 | A1* | 1/2003 | Jones et al. | 324/760 |
| 2004/0151133 | A1* | 8/2004 | Yi et al. | 370/312 |
| 2004/0160938 | A1* | 8/2004 | Lee et al. | 370/349 |
| 2004/0224698 | A1* | 11/2004 | Yi et al. | 455/450 |
| 2005/0042985 | A1* | 2/2005 | Cheng et al. | 455/24 |
| 2005/0042987 | A1* | 2/2005 | Lee et al. | 455/67.11 |
| 2005/0094670 | A1* | 5/2005 | Kim | 370/477 |
| 2005/0114023 | A1* | 5/2005 | Williamson et al. | 701/214 |
| 2005/0185620 | A1* | 8/2005 | Lee et al. | 370/331 |
| 2005/0207354 | A1* | 9/2005 | Nekovee et al. | 370/260 |
| 2005/0246299 | A1* | 11/2005 | Scarborough et al. | 706/21 |
| 2006/0019641 | A1* | 1/2006 | Vayanos et al. | 455/414.1 |
| 2006/0069799 | A1* | 3/2006 | Hundscheidt et al. | 709/232 |
| 2006/0182057 | A1* | 8/2006 | Singvall et al. | 370/329 |
| 2006/0184482 | A1* | 8/2006 | Flinn et al. | 706/45 |
| 2006/0253601 | A1* | 11/2006 | Vedantham et al. | 709/231 |
| 2006/0265276 | A1* | 11/2006 | Weller et al. | 705/10 |
| 2007/0070972 | A1* | 3/2007 | Wang et al. | 370/349 |
| 2007/0070995 | A1* | 3/2007 | Pelletier et al. | 370/389 |
| 2007/0226163 | A1* | 9/2007 | Robles | 706/50 |
| 2007/0281714 | A1* | 12/2007 | Douglas et al. | 455/456.1 |
| 2007/0281726 | A1* | 12/2007 | Rey et al. | 455/522 |
| 2007/0283025 | A1* | 12/2007 | Yi et al. | 709/228 |
| 2008/0045224 | A1* | 2/2008 | Lu et al. | 455/446 |
| 2008/0065945 | A1* | 3/2008 | Curcio et al. | 714/748 |
| 2008/0198763 | A1* | 8/2008 | Fischer et al. | 370/254 |

OTHER PUBLICATIONS

Friedman Timur, "Scalable Estimation of Multicast Session Characteristics", A.B., Harvard College, University of Massachusettes, 20002, 158 pages.*

Park et al., "A Dynamic Packet Recovery Mechanism for Realtime Service in Mobile Computing Environments", ETRI Journal, vol. 25, No. 5, Oct. 2003, pp. 356-268.*

PCT International Search Report dated Feb. 6, 2006.

Brown K.: "The RTCP gateway: scaling real-time control bandwidth for wireless networks," Computer Communications, Elsevier Science Publishers BV, Amsterdam, NL, vol. 23, No. 14-15, Aug. 30, 2000, pp. 1470-1483, XP004209395, ISSN: 0140-3664.

3rd Generation Partnership Project: "3GPP TR23.846 y 6.1.0: Multimedia Broadcast/Multicast Service (MBMS): Architecture and Functional Description (Release 6)," Technical Specification Group Services and System Aspects, 'Online! Dec. 1, 2002, XP002313494, Retrieved from the internet: URL:http://212.234.161.21/ftp/Specs/archiv/23_series/23.846/23846-610.zip> 'retrieved on Jan. 14, 2004, cited in the application, *section 6*.

Chesterfield J et al.; "RTCP Extensions for Single-Source Multicast Sessions (draft-ietf-avt-rtcpssm-04.txt)" Internet Engineering Task Force, Jun. 29, 2003, XP015001395 *section 3* *section 9*.

Casner S: "SDP Bandwidth Modifiers for RTCP Bandwidth (draft-ietf-avt-rtcp-bw-05.txt)" Internet Engineering Task Force, Nov. 20, 2001, XP015001381, *section 1*.

H. Schulzrinne, et al.: "RTP: A Transport Protocol for Real-Time Applications", The Internet Society, Jul. 2003, pp. 1-104, http://www.ietf.org.

S. Bhattacharyya, Ed.: "An Overview of Source-Specific Multicast (SSM)", The Internet Society, Jul. 2003, pp. 1-14, http://www.ietf.org.

S. Casner: "Session Description Protocol (SDP) Bandwidth Modifiers for RTP Control Protocol (RTCP) Bandwidth", The Internet Society, Jul. 2003, pp. 1-8, http://www.ietf.org.

J. Bolot, et al.: "Scalable Feedback Control for Multicast Video Distribution in the Internet", Proceedings of ACM/SIGCOMM 1994, vol. 24, No. 4, Oct. 1994, pp. 58-67.

T. Friedman, et al.: "RTP Control Protocol Extended Reports (RTCP XR)", The Internet Society, Nov. 2003, pp. 1-55, http://www.ietf.org.

T. Paila, et al.: "Flute—File Delivery Over Unidirectional Transport; draft-ietf-rmt-flute-07.txt", The Internet Society, Dec. 11, 2003, pp. 1-32, http://www.ietf.org.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|  subtype  |   PT=APP=204  |             length            |
+-+-+-+-+-+-+-+-+-+-+-+-+-+-+-+-+-+-+-+-+-+-+-+-+-+-+-+-+-+-+-+-+
|                          SSRC/CSRC                             |
+-+-+-+-+-+-+-+-+-+-+-+-+-+-+-+-+-+-+-+-+-+-+-+-+-+-+-+-+-+-+-+-+
|                          name (ASCII)                          |
+-+-+-+-+-+-+-+-+-+-+-+-+-+-+-+-+-+-+-+-+-+-+-+-+-+-+-+-+-+-+-+-+
|                   application-dependent data             ...
+-+-+-+-+-+-+-+-+-+-+-+-+-+-+-+-+-+-+-+-+-+-+-+-+-+-+-+-+-+-+-+-+
```

Fig. 3

```
+-+-+-+-+-+-+-+-+-+-+-+-+-+-+-+-+-+-+-+-+-+-+-+-+-+-+-+-+-+-+-+-+
|                         Time Interval                          |
+-+-+-+-+-+-+-+-+-+-+-+-+-+-+-+-+-+-+-+-+-+-+-+-+-+-+-+-+-+-+-+-+
|        Probability            |       Report Bandwidth         |
+-+-+-+-+-+-+-+-+-+-+-+-+-+-+-+-+-+-+-+-+-+-+-+-+-+-+-+-+-+-+-+-+
```

Fig. 4

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| reserved  |   PT=XR=207   |             length            |
+-+-+-+-+-+-+-+-+-+-+-+-+-+-+-+-+-+-+-+-+-+-+-+-+-+-+-+-+-+-+-+-+
|                             SSRC                               |
+-+-+-+-+-+-+-+-+-+-+-+-+-+-+-+-+-+-+-+-+-+-+-+-+-+-+-+-+-+-+-+-+
|     BT        |     rsvd      |         block length           |
+-+-+-+-+-+-+-+-+-+-+-+-+-+-+-+-+-+-+-+-+-+-+-+-+-+-+-+-+-+-+-+-+
|                         SSRC of source                         |
+-+-+-+-+-+-+-+-+-+-+-+-+-+-+-+-+-+-+-+-+-+-+-+-+-+-+-+-+-+-+-+-+
|                         Time Interval                          |
+-+-+-+-+-+-+-+-+-+-+-+-+-+-+-+-+-+-+-+-+-+-+-+-+-+-+-+-+-+-+-+-+
|        Probability            |       Report Bandwidth         |
+-+-+-+-+-+-+-+-+-+-+-+-+-+-+-+-+-+-+-+-+-+-+-+-+-+-+-+-+-+-+-+-+
```

Fig. 5

```
+-+-+-+-+-+-+-+-+-+-+-+-+-+-+-+-+-+-+-+-+-+-+-+-+-+-+-+-+-+-+-+-+
|                          Time Interval                        |
+-+-+-+-+-+-+-+-+-+-+-+-+-+-+-+-+-+-+-+-+-+-+-+-+-+-+-+-+-+-+-+-+
|R|D|     Probability       |         Report Bandwidth          |
+-+-+-+-+-+-+-+-+-+-+-+-+-+-+-+-+-+-+-+-+-+-+-+-+-+-+-+-+-+-+-+-+
|                           Timer value                         |
+-+-+-+-+-+-+-+-+-+-+-+-+-+-+-+-+-+-+-+-+-+-+-+-+-+-+-+-+-+-+-+-+
```

Fig. 6

FEEDBACK CONTROL FOR MULTICAST OR BROADCAST SERVICES

FIELD OF THE INVENTION

The invention relates to a method for controlling the transmission of feedback of mobile terminals receiving via an air interface of a mobile communication system a multicast or broadcast service transmitted or forwarded by a feedback control entity and to a mobile terminal and the feedback control entity using this method. Further, a communication system comprising a feedback control entity and a mobile terminal receiving a multicast or broadcast service is provided.

TECHNICAL BACKGROUND

The Real-time Transport Protocol (RTP) (see Schulzrinne et al., "RTP: A Transport Protocol for Real-Time Applications", RFC 3550, incorporated herein by reference and available at http://www.ietf.org) provides end-to-end network transport functions suitable for applications transmitting real-time data, such as audio, video or simulation data, over multicast or unicast network services. RTP does not address resource reservation and does not guarantee quality-of-service for real-time services.

The data transport is augmented by a control protocol (RTCP) to allow monitoring of the data delivery in a manner scalable to large multicast networks, and to provide minimal control and identification functionality. RTP and RTCP are designed to be independent of the underlying transport and network layers.

For the multicast or broadcast data transport of streaming services in 3G networks RTP may be used. As mentioned above, the Real-Time Control Protocol (RTCP) provides means for monitoring and transporting control information on a delivered RTP stream.

Standard RTP/RTCP

RTP (and its companion protocol RTCP) have been originally designed for both unicast as well as multicast data transport (RTP reporting). Consequently, scalable algorithms for preventing feedback implosion and the corresponding mechanisms have been proposed. In the rest of this document it is referred to the latter as "the standard RTCP algorithm and mechanisms", respectively.

The RTCP standard algorithm and mechanisms have been designed with the assumption of an underlying Any-Source Multicast (ASM) model, where every end system is allowed to send and receive data over the bidirectional transport channel.

Consequently, each participating end system receives the RTP data, as well as the RTCP sender reports (SR) and receiver reports (RR) of all participants. The reception of all RR allows each end system to estimate the number of participants of a session independently, and use this value to calculate the report time interval according to the RTCP standard algorithm. Furthermore, it provides a means for the end hosts to gather information about all participants, which might be useful for some applications like small group conferencing.

RTCP RR for Unidirectional Multicast Channels

The Source-Specific Multicast (SSM) model as described S. Bhattacharyya, Ed. "An Overview of Source-Specific Multicast (SSM)" (see RFC 3569, incorporated herein by reference and available at http//www.ietf.org) may be particularly suitable for use in conjunction with the 3GPP MBMS architecture as specified in 3GPP TR 23.846: "Multimedia Broadcast/Multicast (MBMS); Architecture and functional description (Release 6)", V6.1.0, December 2003, incorporated herein by reference and available at http://www.3gpp.org.

The SSM multicast model introduces less complexity compared to ASM and allows for subscription-based access control. In SSM, each single end system is allowed to transmit data using a unidirectional multicast transport channel. Only those participants subscribed to this channel will receive the messages.

Unlike in ASM, RTCP receiver reports cannot be transmitted over this multicast channel. This limitation for the SSM may however be overcome by each receiver sending feedback over individual unicast transport channels to the sender and the sender reflecting these messages over the multicast channel, according to the specified Receiver and Sender Report bandwidth values.

SDP Bandwidth Modifiers for RTCP

The standard RTCP mechanisms scale the overall control traffic bandwidth to 5% of the RTP Session Bandwidth. For the target application scenario with a single sender, the fraction S of the RTP Bandwidth assigned for sender reports (SR) is 1.25%, while the fraction R equally shared by the end systems for receiver reports (RR) is assigned a value of 3.75%. In order to support assignment of differing allocations, the signaling of RTCP bandwidth modifiers within the Session Description Protocol (SDP) has been proposed by Casner, "Session Description Protocol (SDP) Bandwidth Modifiers for RTP Control Protocol (RTCP) Bandwidth" (see RFC 3556, incorporated herein by reference and available at http://www.ietf.org).

The SDP instance for the particular session may be extended with two additional parameters, where b=RS:<bandwidth-value> and b=RR:<bandwidth-value> specifies the overall sender and receiver report rate, respectively. The per-host allocation and report time interval is determined according to the standard RTCP algorithm.

Multicast Feedback Regulation

The bulk of existing work as considered within the IETF RMT Working Group addresses the problem of suppressing redundant feedback, e.g. negative acknowledgements of lost data packets for reliable multicast transmission. Other multicast applications demand for feedback of the end system with an extreme value according to a particular metric.

The goal of these schemes is to find the receiver with the limiting capabilities (bandwidth) in a multicast session, so that the sender adjusts the transmission rate with respect to this receiver's feedback. End-to-end solutions to both problems usually use different variants of feedback timers or polling mechanisms.

Hardly any existing work deals with feedback regulation for collecting state information of participating receivers in a multicast. One prominent mechanism for video streaming applications based on collecting receiver state information is presented in Bolet et al., "Scalable Feedback Control for Multicast Video Distribution in the Internet" (Proceedings of ACM/SIGCOMM 1994, Vol. 24, No. 4, October 1994). The primary goal of the proposed mechanism is to adjust the sending rate of packets according to the reported state information.

Hence, the set of states a receiver is allowed to report is limited to only three different states. Consequently, this approach is not applicable for regulating feedback of statistics in 3GPP MBMS sessions due to the following problems:

The number of participating end systems has to be discovered by each receiver by means of RTCP RR. This requires each participating mobile terminal (MT, UE) to establish a point-to-point feedback channel to the sender.

The sender would then have to reflect all RRs or summarize them and forward this information on the unidirectional multicast channel. The shortcomings of this solution in the context of a cellular and mobile environment are obviously:

- the cost for the establishment and maintenance of the feedback channels (one per MT/UE),
- the overhead on the multicast channel generated by the reflected reports, and
- the power consumption overhead on the end devices which have to maintain and update state information dynamically.

Unicast feedback channels might require a significant amount of resources within a cell, e.g. if every user is to have a dedicated uplink channel having for example an individual spreading code. This situation may lead to an increased call blocking and handoff dropping probability in the corresponding cells.

The per-receiver bandwidth $b_{RR}$ is calculated with the standard algorithm as follows:

$$b_{RR} = \min\left(\frac{avg(P_{RTCP})}{T_{min}}, \frac{B_{RR}}{n}\right)$$

with the minimum time interval $T_{min}$ (e.g. 5 s), the RTCP packet size $P_{RTCP}$, the overall receiver report bandwidth $B_{RR}$ (3.75% of the RTP bandwidth), and the number of receivers n. The resulting per-receiver bandwidth $b_{RR}$ as a function of the group size is depicted in FIG. 1.

Per-receiver Bandwidth as Calculated with the Standard RTCP Algorithm

Due to group dynamics—receivers may join and leave during an ongoing session—the effective per-receiver bandwidth is not known a priori and may vary significantly. In order to avoid frequent re-establishment of feedback channels in order to adapt to the current group size, receiver feedback channels would have to be established with resources reserved to the upper bound, i.e. in the worst case the maximum RR bandwidth. As a consequence, reserved resources for the feedback channels might be used very inefficiently.

The RTCP RR time interval T is calculated by the standard RTP algorithm as follows:

$$T = \max(T_{min}, T_{calc})$$

where $$T_{calc} = n \times \frac{avg(P_{RTCP})}{B_{RR}}$$

with the minimum time interval $T_{min}$, the number of receivers n, the RTCP packet size $P_{RTCP}$, and the overall receiver report bandwidth $B_{RR}$.

FIG. 2 shows the RR time interval T (calculated according to the equations above) versus the number of receivers n participating in the RTP session. The time interval increases linearly with the number of participating receivers.

To illustrate the quantitative effect, the following example of streaming audio-visual content with a data rate of 64 kbps may be considered. For an average RTCP RR packet size of 120 Bytes and n=100 the report time interval will be calculated to $T_{100}$=40 s, i.e.; for n=9,000 it already reaches $T_{9,000}$=3,600 s=1 h.

Following the standard algorithm, receivers schedule their report packets probabilistically within the interval [0.5 T, 1.57 T] following a uniform distribution. I.e., in the above example the first report packet is expected to be sending after 20 s and 0.5 h, respectively. Obviously this resulting RR time interval T is unacceptable for practical purposes.

As mentioned above, the standard RTCP approach addresses the characteristics of the ASM model, where every end system may send and receive data over a single bi-directional channel and further provides the possibility of loss reporting. However, for 3GPP MBMS services the interval would easily exceed the duration of a session, making reporting useless.

Further it is to be noted that also for broadcast data delivery it may be considered to provide feedback from the receivers of a broadcast service, especially as content based charging may be used also for broadcast data delivery, where the quality of the received content may be crucial for charging. In contrast to subscription based charging where only the fact that a certain service is received is of importance.

The above mentioned RTP and MBMS specific problems may be generalized to multicast or broadcast services received at mobile terminals via an air interface using protocols enabling the provision of feedback from the receiving terminals to the sending source, e.g. a multicast or broadcast server.

In WO 2004/040928 A1 method for reporting for multi-user services in wireless networks is known. The concept of this document is to generate aggregated feedback reports based on the RNC knowledge of the air interface resources in an intermediate network part. RTCP feedback from the terminals can be disabled for the multi-user service, i.e. for all receivers of the multi-user service. In a variation all receivers of the multi-user service may be configured by the RNC to provide event driven feedback. This information from the receivers may also be used in the RNC to form the aggregated feedback.

The method and system proposed in WO 2004/040928 A1 uses the RNC's knowledge on the radio resources of the mobile communication system to generate aggregated feedback reports transmitted to the source of the multi-user service, the server. Thereby the end-to-end concept multi-user service provision is sacrificed as the method proposed in this document requires interactions and data exchange among different layers, for example as the session layer and radio resource control as well as proprietary extensions between radio resource management in the RNC and the intermediate network part to communicate data. These extensions are not feasible if the architecture for providing a multicast or broadcast service should be widely settled.

SUMMARY OF THE INVENTION

One of the ideas of the invention is to allow only a subset of terminals receiving a multicast or broadcast service from a feedback control entity within the mobile communication network to provide feedback to the sending source, i.e. the feedback control entity. Thereby it is possible to keep the end-to-end concept and to not break the layered architecture of the utilized protocols. Another idea of the invention is the use of statistical user sampling based on which the subset of terminals providing feedback is determined.

According to an embodiment of the invention a method for controlling the transmission of feedback of mobile terminals receiving via an air interface of a mobile communication system a multicast or broadcast service transmitted or forwarded by a feedback control entity is provided. According to this method a mobile terminal may receive the multicast or broadcast service via a unidirectional downlink channel and using an unreliable transport protocol and a session protocol, wherein the session protocol configures feedback provision of terminals receiving the multicast or broadcast service. Further, the mobile terminal may receive parameters based on which it may decide whether to provide feedback to the feedback control entity or not.

In a decision step the mobile terminal may decide whether to provide session protocol configured feedback for the multicast service or broadcast to the feedback control entity based on the received parameters, and in case it is decided to provide session protocol configured feedback, a bearer for providing feedback to the session protocol configured feedback control entity may be established.

Upon having established the bearer, the mobile terminal may transmit session protocol configured feedback indicating reception statistics of the multicast or broadcast service to the feedback control entity via the established bearer.

This embodiment has the advantage that the mobile terminals may decide based on a set of signaled parameters (or a single parameter) whether to provide session protocol configured feedback. As mentioned above, a bearer for providing session protocol configured feedback is established in case the mobile terminal decide to provide session protocol configured feedback, such that resources e.g. in the radio access network of the mobile communication system are only allocated to the mobile terminal in this case.

In a further embodiment of the invention, the parameters received at the mobile terminal indicate a probability value for a probabilistic experiment based on which the mobile terminal decides whether to provide session protocol configured feedback. Hence, the decision on whether to provide session protocol configured feedback may be based on the result of a probabilistic experiment performed by the mobile terminal, wherein the received probability value is used to perform this experiment.

By using probability metric signaled to the mobile terminals receiving the multicast or broadcast service, the size of the of data (parameters) received from a feedback control entity of the mobile communication system may be reduced but allow each mobile terminal receiving the probability metric to autonomously determine whether to provide session protocol configured feedback. Details on the use of a probabilistic experiment for deciding on whether to provide feedback or not will be provided below.

According to another embodiment of the invention, the probabilistic experiment is a Bernoulli experiment. This may have the advantage that approximations simplifying the calculations when performing the experiment may be used to reduce computational complexity at the mobile terminals.

In a further embodiment of the invention the parameters are received via a multicast or broadcast data channel providing the multicast or broadcast service. In this case the data may be delivered to the terminal using an unreliable transport protocol, for example UDP, as outlined above.

The method according to another embodiment of the invention foresees to receive the parameters via an announcement channel on which the multicast or broadcast service is announced to potential receivers. In a variation of this embodiment a reliable communication protocol is used for data transport on the announcement channel.

This embodiment considers that it may be desirable that each of the terminals receives at least once the signaled parameters in a reliable manner. In case the parameters are provided by means of an unreliable communication protocol it may not be assured that each receiving terminal may have the necessary parameters for deciding whether to provide session protocol configured feedback present.

Another embodiment of the present invention foresees that the parameters received at the mobile terminal further indicate the point in time until which the parameter(s) is/are valid. In a variation of the embodiment, the mobile terminal may release an established bearer for providing session protocol configured feedback in case the point in time indicated by the parameters is reached.

Thereby, it may be assured that mobile terminals use outdated parameter sets to determine whether session protocol configured feedback should be provided from the respective terminal or not. For example, this may be applicable to situations in which the parameters received from the feedback control entity are (e.g. periodically) updated and provided using an unreliable transport mechanism. In this case it may not be assured that each terminal successfully receives an update of the parameter set such that it may be feasible to foresee the above outlined mechanism of indicating a validity period of the parameters.

As already indicated above, another embodiment of the invention facilitates the reconfiguration or update of parameters. The mobile terminal may receive reconfiguration parameters wherein the reconfiguration parameters update the parameters previously received from the feedback control entity.

In a variation of the embodiment, the reconfiguration parameters may comprise a flag indicating whether to update a validity period for the parameters previously received, i.e. indicating whether the parameters should be valid for a so-to-say "additional" time period. In this case, the mobile terminal may update the validity period of the previously received parameters based on this flag.

In a further embodiment, only those mobile terminals having established a bearer for providing session protocol configured feedback may update of the validity period.

Moreover, according to a further embodiment of the invention the received reconfiguration parameters may comprise an (additional) flag indicating whether a new decision on providing session protocol configured feedback is to be performed by the mobile terminal. Thus, depending on the flag the mobile terminal may be controlled to determine whether a new decision on providing session protocol configured feedback.

If the flag indicates to do so, the mobile terminal may decide whether to provide session protocol configured feedback for the multicast or broadcast service to the feedback control entity based on the received reconfiguration parameters. As outlined previously, in case it is decided to provide session protocol configured feedback, a bearer for providing session protocol configured feedback to the feedback control entity may be established and the mobile terminal may transmit session protocol configured feedback indicating reception statistics of the multicast or broadcast service to the feedback control entity via the established bearer.

Next, further embodiments relating to the operation of the feedback control entity will be outlined in the following. It should be noticed that the feedback control entity may be embodied in an individual network element or may be embodied in a network element of the mobile communication network together with the service source, i.e. the multicast or broadcast service provider. One of the various embodiments of the present invention provides a method for controlling by a feedback control entity the transmission of feedback of a plurality of mobile terminals receiving via an air interface of a mobile communication system a multicast or broadcast service transmitted or forwarded by a feedback control entity.

According to this method the feedback control entity may transmit or forward the multicast or broadcast service via a unidirectional downlink channel and using an unreliable transport protocol and a session protocol, wherein the session protocol configures feedback provision of terminals receiving the multicast or broadcast service.

Further, the feedback control entity may determine parameters allowing a mobile terminal deciding whether to provide session protocol configured feedback to the feedback control entity, and may transmitting those parameters to at least a subset of the plurality of mobile terminals receiving the multicast or broadcast service. Accordingly, the feedback control entity may receive feedback from a subset of the plurality of mobile terminals having received the parameters.

In another embodiment of the invention, the feedback control entity determines the parameters based on state information of the multicast and broadcast service maintained by the feedback control entity or received from a network entity of the mobile communication system.

In a further embodiment of the invention, the parameters determined by the feedback control entity may indicate a probability value for a probabilistic experiment based on which the mobile terminal decides whether to provide session protocol configured feedback. Thus, according to this embodiment, the feedback control entity may determine the probability metric to be used by the mobile terminals for the probabilistic experiment and may signal this metric to the at least a subset of the plurality of mobile terminals.

As already outlined above, one embodiment of the present invention foresees that the parameter(s) is/are transmitted via an announcement channel on which the multicast or broadcast service is announced to potential receivers. Further, a reliable communication protocol may be used for data transport on the announcement channel.

According to a further embodiment, the feedback control entity may determine the probability value based on the number of participants of the multicast or broadcast service. The number of participants of the multicast or broadcast service may for example be obtained from multicast or broadcast service related state information.

In another embodiment of the invention, the multicast or broadcast service related state information is comprised within the MBMS UE Context or the MBMS Bearer Context maintained at the feedback control entity. Alternatively, the state information may be received by the feedback control entity from a network entity of the mobile communication network maintaining MBMS UE Contexts or an MBMS Bearer Context.

In a further embodiment of the invention, the feedback control entity may receive the data of the multicast or broadcast service from a multicast or broadcast service provider.

In a variation of this embodiment, the feedback control entity may forward session protocol configured feedback received from the mobile terminals to the multicast or broadcast service provider.

In a further variation the data of the multicast service may be transported to the feedback control entity using a transport protocol and a session protocol. The feedback control entity may translate at least one of the transport protocol and a session protocol to another transport protocol or session protocol, respectively, before transmitting or forwarding the data of the multicast or broadcast service to the mobile terminals.

Further, it may be possible that the feedback for the multicast service is transported to the feedback control entity using a transport protocol and a session protocol. In this case the feedback control entity may further translate at least one of the transport protocol and a session protocol to another transport protocol or session protocol, respectively, before forwarding the feedback to the multicast or broadcast service provider.

In another variation of this embodiment the feedback control entity form an aggregate of the session protocol configured feedback received from the mobile terminals and may transmit the aggregate of the feedback received as feedback information to the multicast or broadcast service provider.

A further embodiment of the invention considers the service provision using RTP. In this embodiment, the multicast or broadcast service is provided using the RTP protocol and feedback is provided using the RTCP protocol, wherein a fraction of the available bandwidth for a session providing the multicast or broadcast service is allocated to the RTCP protocol messages.

Further, in an alternative, the session protocol configured feedback may be provided in from of receiver reports of the RTCP protocol. It should be noticed that according to an embodiment of the invention the reception statistics mentioned above may correspond to the information signaled within a receiver report according to the RTCP protocol.

According to another embodiment of the present invention the parameters transmitted by the feedback control entity and received by the mobile terminal may further indicate the report time interval and the available bandwidth for providing feedback using the RTCP protocol.

The parameters signaled from the feedback control entity may be comprised within a sender report message of the RTCP protocol transmitted by the feedback control entity.

A further embodiment relates to a mobile terminal receiving via an air interface of a mobile communication system a multicast or broadcast service transmitted or forwarded by a feedback control entity. The mobile terminal may comprise a receiver for receiving the multicast or broadcast service via a unidirectional downlink channel and using an unreliable transport protocol. Further, the terminal may receive parameters based on which the mobile terminal decides whether to provide session protocol configured feedback to the feedback control entity, a processor for deciding whether to provide session protocol configured feedback for the multicast or broadcast service to the feedback control entity based on the received parameters and for establishing a bearer for providing session protocol configured feedback to the feedback control entity, in case it is decided to provide session protocol configured feedback and a transmitter for transmitting session protocol configured feedback indicating reception statistics of the multicast or broadcast service to the feedback control entity via the established bearer.

In another embodiment of the invention, the mobile terminal may further comprise means configured to execute the steps performed by the mobile terminal in one of the various embodiments of the feedback control method outlined above.

Another embodiment of the invention provides feedback control entity for controlling the transmission of feedback of a plurality of mobile terminals receiving a multicast or broadcast service transmitted or forwarded by the feedback control entity via an air interface of a mobile communication system. According to this embodiment the feedback control entity may comprise a transmitter for transmitting or forwarding the multicast or broadcast service via a unidirectional downlink channel and using an unreliable transport protocol and a session protocol, wherein the session protocol configures feedback provision of terminals receiving the multicast or broadcast service. Further, the feedback control entity may further comprise a processor for determining parameters allowing a mobile terminal deciding whether to provide session protocol configured feedback to the feedback control entity, wherein the transmitter is configured to transmit the parameters to at least a subset of the plurality of mobile terminals receiving the multicast or broadcast service, and a receiver for receiving session protocol configured feedback from a subset of the plurality of mobile terminals having received the parameters.

In another embodiment of the invention, the feedback control entity may further comprise means configured to execute the steps performed by the feedback control entity in one of the various embodiments of the feedback control method outlined above.

Further, one embodiment of the invention relates to a mobile communication system comprising a feedback control entity as defined above and at least one mobile terminal as defined above for receiving a multicast or broadcast service from feedback control entity via an air interface.

A further embodiment of the invention relates to a computer-readable medium for storing instructions that, when executed by a processor of a mobile terminal, cause the processor to control the transmission of feedback of mobile terminals receiving via an air interface of a mobile communication system a multicast or broadcast service transmitted or forwarded by a feedback control entity by receiving at the mobile terminal the multicast or broadcast service via a unidirectional downlink channel and using an unreliable transport protocol and a session protocol, wherein the session protocol configuring feedback provision of terminals receiving the multicast or broadcast service, receiving at the mobile terminal parameters based on which the mobile terminal decides whether to provide session protocol configured feedback to the feedback control entity, deciding by the mobile terminal whether to provide session protocol configured feedback for the multicast service or broadcast to the feedback control entity based on the received parameters, in case it is decided to provide session protocol configured feedback, establishing by the mobile terminal a bearer for providing session protocol configured feedback to the feedback control entity, and transmitting session protocol configured feedback indicating reception statistics of the multicast or broadcast service from the mobile terminal to the feedback control entity via the established bearer.

In another embodiment the computer-readable medium may further store instructions that, when executed by the processor of the mobile terminal, cause the processor to perform the steps performed by the mobile terminal in one of the various embodiments of the feedback control method outlined above.

Moreover, another embodiment of the invention provides a computer-readable medium for storing instructions that, when executed by a processor of a feedback control entity, cause the processor to control the transmission of feedback of mobile terminals receiving via an air interface of a mobile communication system a multicast or broadcast service transmitted or forwarded from a feedback control entity by forwarding the multicast or broadcast service from the feedback control entity via a unidirectional downlink channel and using an unreliable transport protocol to at least one mobile terminal and a session protocol, wherein the session protocol configuring feedback provision of terminals receiving the multicast or broadcast service, determining at the feedback control entity parameters allowing a mobile terminal deciding whether to provide session protocol configured feedback to the feedback control entity, transmitting the parameters from the feedback control entity to at least a subset of the plurality of mobile terminals receiving the multicast or broadcast service, and receiving at the feedback control entity feedback from a subset of the plurality of mobile terminals having received the parameters.

In a further embodiment, the computer-readable medium may further store instructions that, when executed by the processor of the feedback control entity, cause the processor perform the steps performed by the feedback control entity in one of the various embodiments of the feedback control method outlined above.

BRIEF DESCRIPTION OF THE FIGURES

In the following the present invention is described in more detail in reference to the attached figures and drawings. Similar or corresponding details in the figures are marked with the same reference numerals.

FIG. 3 shows an RTCP application-defined packet, FIG. 4 shows the format of application-defined parameters transported in a RTCP application-defined packet according to an embodiment of the invention, FIG. 5 shows the format of an extended RTCP receiver report block according to an embodiment of the invention, FIG. 6 shows the format of for transporting parameters in an RTCP application-defined packet of FIG. 3 or an extended RTCP receiver report block as shown in FIG. 5 according to an embodiment of the invention.

DETAILED DESCRIPTION OF THE INVENTION

Figure 1:
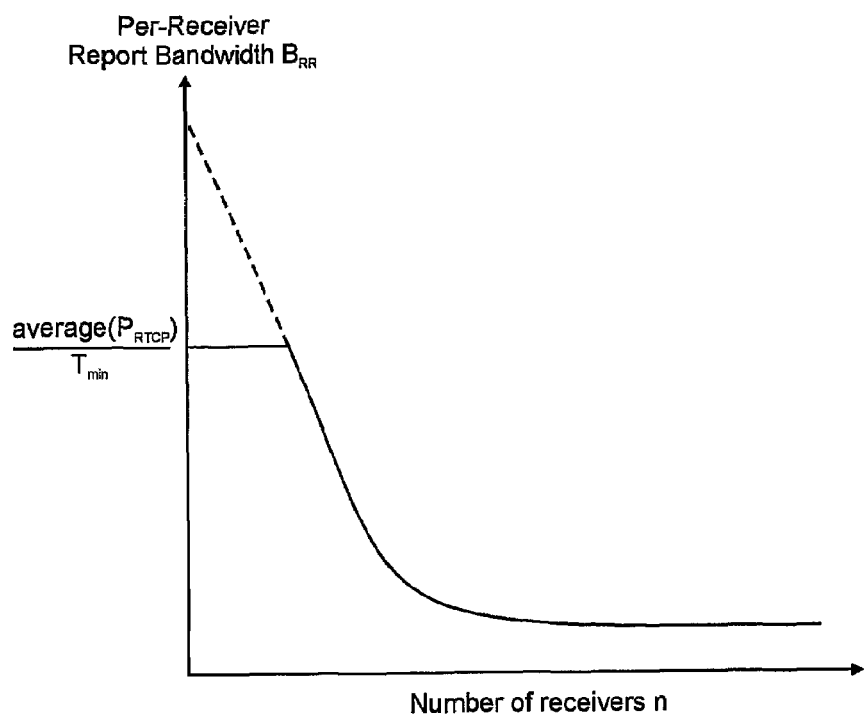
FIG. 1 shows the per-receiver report bandwidth as a function of the number of receivers n receiving which have subscribed to an RTP session.
Figure 2:
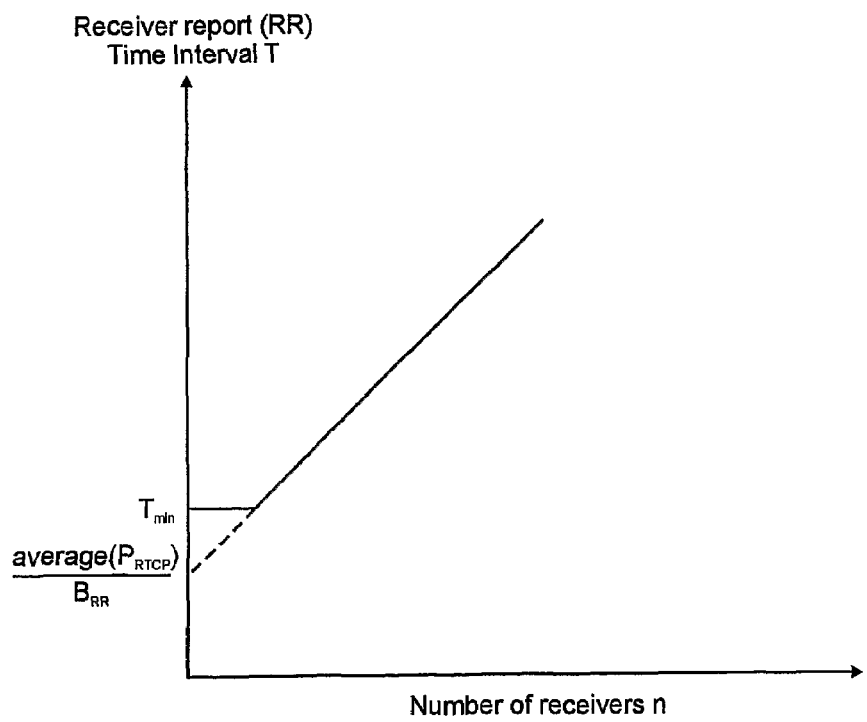
FIG. 2 shows the receiver report (RR) time interval T as a function of the shows the number of receivers n receiving which have subscribed to an RTP session.

The following paragraphs will describe various embodiments of the invention. For exemplary purposes only, most of the embodiments are outlined in relation to a UMTS communication system and the terminology used in the subsequent sections mainly relates to the UMTS terminology. However, the used terminology and the description of the embodiments with respect to a UMTS architecture is not intended to limit the principles and ideas of the present invention to such systems.

Also the detailed explanations given in the Technical Background section above are merely intended to better understand the mostly UMTS specific exemplary embodiments described in the following and should not be understood as limiting the present invention to the described specific implementations of processes and functions in the mobile communication network.

The ideas and principles that will be outlined in the subsequent sections may be applicable to multicast or broadcast services received at mobile terminals via an air interface using a unidirectional downlink as well as an unreliable transport protocol for data delivery. Further, protocols enabling the provision of feedback from the receiving terminals to the sending source, e.g. a feedback control entity, are used. It is noted that in the scenario described above, the feedback may not be provided via the channel through which the service data is received since same is unidirectional.

The key aspect of one embodiment of the invention is to allow only a subset of terminals receiving a multicast or broadcast service from a feedback control entity to provide feedback to the feedback control entity in the mobile communication network which may control service and feedback provision within the communication network, as outlined previously. In an embodiment of the invention, this may for example be achieved by letting the mobile terminal receiving a multicast or broadcast service decide—e.g. based on a probabilistic experiment—whether they provide feedback or not. By signaling parameters, e.g. a probability value to be used in the experiment, the feedback control entity may control feedback by varying the signaled parameters such that—statistically—the desired number of mobile terminals receiving a service provides feedback.

In this respect it is important to note that the basis for a multicast or broadcast service is an end-to-end concept, which means that the exchanged information between the end points is transparent to optional intermediate nodes. This is also reflected by the utilized protocols that follow a layered architecture, which capsulate the conveyed information within a certain layer. Information at one layer is initially not visible to other layers. Only adjacent layers can exchange information over well-defined services and service access points. As the transmitted information of the multicast or broadcast service is only visible to the sending source, i.e. the feedback control entity and the receivers, the intermediated nodes only support protocols of lower layers than the used transmission protocol.

The idea of selecting a subset of terminals receiving the multicast or broadcast service to provide feedback keeps this end-to-end concept and does not break the layered architecture of the utilized protocols.

In contrast, generating feedback in an intermediated node of the UTRAN or CN would break these concepts and would require changing the protocols in an incompatible way and extending the intermediate nodes to perform improper functionality. Either one of these assumptions is not feasible if the architecture for providing a multicast or broadcast service is widely settled.

Another embodiment of the present invention is based on the idea to provide a configurable and adaptive feedback solution for MBMS Services. In the following this embodiment will be explained in more detail.

MBMS Services typically use the RTP protocol for streaming media. The companion RTCP protocol may be used for collecting RTP session feedback and to provide a loose control of the session. RTCP feedback may be used to collect statistics about ongoing RTP multicast session. As the underlying unreliable transport protocol UDP may be assumed.

Instead of the standard RTP algorithms, i.e. using RTCP RR to estimate the number of participating mobile terminals (MT), the scheme proposed by this embodiment of the invention uses MBMS signaling and/or MBMS state information to determine the exact number of MT/UE in a session. This approach avoids the necessity of having a feedback channel for every receiver, the fact that every participant receives all messages from the rest of participants and eliminates the multicast/broadcast as well as computation overhead.

Generally, it should be noted that in the MBMS specifications, there are two types of state information: a MBMS Bearer Context describing a particular MBMS bearer service and a MBMS UE Context, which comprises UE-specific information related to a specific MBMS bearer service. Both contexts may be created in the RAN, SGSN, GGSN and BM-SC. A UE context may be created for each UE receiving the service. At present, the Bearer Context in the GGSN contains the number of UEs receiving the service.

However, it may of course also possible that other RAN or CN nodes store state information of the service within a context, that allow either to determine the number of service participating UEs e.g. by counting the number of contexts created (i.e. each UE has its own UE context in the network node) or by a field within a context indicating the total number of service participants.

In case when employing a MBMS architecture for service provision, e.g. the number of participants the UE contexts of the BM-SC can be counted or the GGSN can provide the total number of participants signaling the respective field value of the Bearer Context to the BM-SC.

The usage of statistical user sampling for the collection of session statistics may be used to only allow a subset of mobile terminals (MT) to provide feedback. I.e., only a set of receivers is configured to send reports to the feedback control entity. This is in contrast to standard RTP multicast where every participant is sending RTCP feedback and which is typically forwarded to all others.

According to this embodiment of the invention, the set of reporting receivers is selected in a probabilistic manner. One parameter necessary to perform statistical user sampling may be the report probability. Further parameters that may be used/signaled are the report time interval and feedback bandwidth to reserve. The sending feedback control entity, e.g. the BM-SC, may set these parameters according to the overall amount of allowed feedback, as different services might have different reporting needs.

By employing this scheme the number of feedback channels may be controlled and each feedback channel is used more efficiently.

The parameters for the configuration of the scheme mentioned above may be transported to the multicast/broadcast group participants. This may be accomplished by using the multicast/broadcast data channel or an announcement channel, for example.

A variant of this embodiment provides a feedback control entity (e.g. BM-SC) with the possibility to reconfigure the reporting receiver set and to (re)set the report time interval during an ongoing session to a constant value independent of the group size. This may tackle the problem of allowing to set the report time interval for the RR to reasonable values.

In order to avoid terminals operating with different reporting interval and probabilities after reconfiguration, a timer value may be included in these messages. Thereby, the signaling and overhead on the multicast channel may be kept to a minimum, as well as the computational overhead emerging by the calculation of the parameters on each end device.

The standard RTP/RTCP algorithms and mechanisms follow a generic design in order to support a broad class of applications with single and multiple data sources and receivers.

The goal of the activities in the context of 3GPP MBMS are more specific than the provisions of RTP/RTCP and are focused on providing unidirectional data delivery services from a single server to a set of mobile terminals, i.e. streaming or download services.

Hence, as indicated above, one embodiment of the invention relates to an optimization for the latter environment while utilizing RTP and RTCP. In particular the goal of this embodiment may be to support feedback of statistics regarding a RTP data delivery session while solving some of the problems described in the introduction section above.

One part of the 3GPP MBMS Architecture is the MBMS Bearer Context. In this Bearer Context the necessary information to establish the link across the 3G network is gathered. The MBMS Bearer Context is typically stored at every node in the path via which the MBMS service data are provided to the terminal, i.e. in the BM-SC, the RAN, GGSN and SGSN.

The number of hosted UEs is also stored in the MBMS Bearer Context in the GGSN. Thus, the GGSN may provide the number of hosted UEs to the BM-SC, such that the BM-SC may have knowledge about the exact number of participating UEs in a MBMS session avoiding the delay and overhead inherent to using RTCP feedback to determine the number of users participating in an RTP session. Thus, instead of determining the number of UEs by collecting feedback reports from every participant, state information stored in the Bearer Context may be used.

Since the number of session participants may be determined based on MBMS state information and without using feedback from the participating users, it is not necessary to maintain a feedback channel for each participant. Thus, significant savings in available resources in the RAN and Core Network of the mobile communication system may be achieved. As outlined above, an embodiment of the invention foresees that state information related to the service and that may be stored within one or more of the network nodes in the RAN and/or CN may be used to determine the number of terminals receiving a particular service. If necessary state information may be exchanged between the network nodes.

As indicated previously, in order to reduce the necessary resources allocated for feedback purposes, only M receivers, being a subset of the receivers, may be chosen to establish M uplink channels for feedback to the server. The MBMS server may determine the value for the overall feedback bandwidth $B_{RR}$ as well as the number of available feedback channels M.

Since the feedback control entity may know the structure and average size of the report packets $P_{RTCP}$, it may calculate the report interval for each feedback message T, according to the following equation:

$$T = M \times \frac{avg(P_{RTCP})}{B_{RR}}$$

According to an embodiment of the invention, a probabilistic approach may be taken for the selection of the reporting receiver set M. Each receiver may perform a probabilistic experiment, for example a Bernoulli experiment with a success probability p. For the calculation of this value the probability density function may be characterized as follows.

Assuming that n users perform the Bernoulli experiment with probability p, and assuming that each experiment is independent from the others, a binomial distribution may be obtained and the probability density function may be expressed as:

$$f_X(x) = P(X = x) = \binom{n}{x} p^x (1-p)^{n-x}$$

Furthermore, the probability distribution function is given by:

$$F_X(x) = P(X \leq x) = \sum_{k \leq x} \binom{n}{k} p^k (1-p)^{n-k}$$

The binomial distribution can, under certain conditions, be approximated with a Gauβ distribution. The requirements are that:

np>4 n(1−p)=nq>4

This approximation may also be used for simplification when considering MBMS services, since in general it may be assumed that multicast services are sent to a large number of users.

Given this simplification the equation is more tractable. The probability density function of the simplified binomial distribution would be a Gauβ distribution with the following mean and variance:

$$f_X(x) = P(X = x) = \frac{1}{\sqrt{2\pi npq}} e^{-\frac{1}{2}\left(\frac{x-\mu}{\sigma}\right)^2}$$

with

μ=np and σ²=npq.

The total number of currently participating receivers in the multicast session n may be determined according to the MBMS Bearer Context, as mentioned above. In this manner, the server may have all the information stored for calculating the success probability p.

Thus, it is reasonable to let the feedback control entity perform the above calculation, and subsequently announce all the necessary parameters (time interval T, probability p, per-receiver report bandwidth, $B_{RR}/M=b_{RR}$) to the group over the multicast/broadcast channel.

From the above probability distribution functions, we can obtain a value of p that results in a total number of reporting receivers M, which should be in the interval $(M_{Min}, M_{Max})$ as the value of p that fulfils:

$$P(M_{Min} \leq x \leq M_{Max}) = F_x(M_{Max}) - F_x(M_{Min})$$

This equation may be solved using the approximation outlined above or other methods, which are not more closely specified in this document (see for example Bronstein et al., "Taschenbuch der Mathematik", 1999, chapter 16.2.3.1: "Binomialverteilung").

Once the value of p as above is received by a UE, it may perform a Bernoulli experiment. Only if the result of the experiment is positive, the receiver may establish a feedback channel with the provided per-participant receiver report bandwidth $b_{RR}$. It is noted that a UE may have the chance to specify the required bandwidth for the bearer depending on the system in which the principles outlined in this document are used. The UE may then send a RTCP RR after the specified time interval T.

According to one embodiment of the invention, the parameters used for receiver configuration, i.e. for allowing an UE to determine whether to provide feedback or not, may be transported to the receivers utilizing RTCP sender report blocks. For this purpose several options may be available.

A first possibility may be to use application-defined packets (APP packets) conforming the RTCP specification as shown in FIG. 3. Generally, the APP packet is intended for experimental use as new applications and new features are developed, without requiring packet type value registration.

In FIG. 3, the fields V, P, subtype, PT, length and SSRC are defined in RFC 3500, section 6.7. The name field may for example be set to "MBMS" but any other name consisting of up to 4 octets may be used instead. Further, the application-dependent data may be appended to the fields mentioned before.

In the exemplary embodiment of the invention shown in FIG. 4 the application-specific part of the APP packet may comprise consists at least of the following fields: a time interval indicating the (RTCP) report time interval in milliseconds, a probability value in a fixed-point representation of the success probability for the probabilistic experiment and the report bandwidth specifying bandwidth (e.g. in bits per second) a receiver has to allocate for the report channel, given the probabilistic experiment is successful.

With the fixed-point representation of the probability value, the maximum probability p=1 may for example be coded as a sequence of 16 bits ("1111111111111111"). Hence, the resolution for p equals $1/(2^{16}-1)$).

A further embodiment of the invention foresees to transmit the necessary parameters by means of a newly defined extended receiver report block (XR report block) as shown in FIG. 5. In "RTP Control Protocol Extended Reports (RTCP XR)", Friedman et al. (see RFC 3611, incorporated herein by reference and available at http://www.ietf.org) specify a framework for defining ad-hoc RTCP report blocks with extended capabilities. According to this embodiment, such a block may be defined to convey the reporting information as specified above (e.g. reporting interval, reporting probability, etc.).

In the XR report block shown in FIG. 5, the fields V, P, reserved, PT, length, SSRC are defined as in RFC 3611, section 2. Similarly the fields BT, rsvd (for type-specific info) and block length are defined in section 3 of RFC 3611. The field BT (block type) takes an unused value in the range (8, 255). Values 0-7 are already used.

This option has the advantage that it includes the possibility to implement the logic directly in the RTP protocol instead of at the application layer when using an APP report block as outlined above. The solution proposed by this embodiment of the invention has the further advantage that receivers may use or provide extended reporting possibilities available as per RFC 3611 or defined within this document.

In a further embodiment of the invention it is suggested to use methods such as profile specific extensions in the RTP header, an ad-hoc report block or a profile-specific extension for RTCP for conveying the parameters for allowing the mobile terminals to determine whether to provide feedback to same.

In the following, several variants on how to transport the reporting information (using partially different transport protocols) according to several embodiment of the invention are outlined in following sections.

Due to its probabilistic nature and in case RTP running over the unreliable transport protocol such as UDP, the embodiments outlined above may not guarantee the establishment of exactly the preferred number of feedback channels.

One reason for this may be that not enough number of participants receives the parameters from the feedback control entity, so that the targeted minimum of reports may not reached. As mentioned above, packets in the downstream might get lost due to use of an unreliable transport mechanism.

Another reason may be that the experiment resulted in too few users actually sending feedback messages due to the probabilistic nature of the experiment. This should be a rare case, as the equation $$P(M_{Min} \leq x \leq M_{Max}) = F_x(M_{Max}) - F_x(M_{Min}) \text{ (see also above)}$$

may be solved so that the probability for too few users sending feedback is minimal.

Also, various other reasons such as an increase in reporting bandwidth may make it reasonable to allow a receiver reconfiguration.

In the following, an embodiment of the invention outlines how the reconfiguration of parameters for deciding whether to provide feedback or not at a mobile terminal may be reconfigured. In addition to the information signaled according the embodiments above (see FIG. 4 and FIG. 5), two flags indicating a reconfiguration and some timer information may be included to the packets conveying the parameters to the mobile terminals. The timer may for example avoid that different participants use different settings and thereby exhaust the uplink bandwidth.

A packet structure according to this embodiment is shown in FIG. 6. As in the embodiments outlined with respect to FIG. 4 and FIG. 5 above, the packet comprises a probability field. Assuming that the field is 14 bits long and using a fixed-point representation of the success probability for the Bernoulli experiment the resolution for p equals $1/(2^{14}-1)$. A probability of p=1 may be indicated by a sequence of 14 predetermined bits (e.g. "11111111111111").

Besides the probability field, the report bandwidth field and the time interval field, the packet structure may comprise a reconfiguration flag (R), a delta flag (D) and a timer value field (e.g. 32 bits) indicating the time interval (e.g. in milliseconds) for which this parameters are valid.

When the timer expires and this receiver has not received a new value the receiver (mobile terminal) may stop using these values and may tear down an established feedback channel. This may be feasible in order to avoid that terminals operate with different settings because successive reporting settings (parameters) were not received by the same set of participants. Receivers with established feedback channels may listen for reporting settings and may update their timer values accordingly.

The reconfiguration flag (R) may indicate to the receivers whether there a reconfiguration is to be performed. If the reconfiguration flag is not set (e.g. R=0) the message is used to refresh the timer values of the receivers with an already established feedback channel. This is used to keep the existing reporting receivers and no reconfiguration is performed. With the reconfiguration flag set (e.g. R=1) the receivers have to perform the probabilistic experiment according to state of the delta flag (D).

The delta flag (D) may define the scope of the reconfiguration if the reconfiguration flag is set (e.g. R=1). If the delta flag is not set (e.g. D=0) the reconfiguration applies to all receivers. In this case all receivers may perform the probabilistic experiment according to the specified probability value. This may be used to initially select reporting receivers or to completely reconfigure an established reporting scenario, e.g. to stop all reporting receivers.

In case the delta flag is not set (e.g. D=0) a mobile terminal which has already decided to perform feedback and thus already established a feedback channel previously, may keep that channel instead of performing a teardown and reestablishment. The latter may hold true only under the assumption that the established uplink provides the same bandwidth as announced in the new message. If the bandwidth has changed, the receiver may need to teardown the old channel and to reestablish a new feedback channel (bearer).

If the delta flag is set (e.g. D=1) the reconfiguration may apply only to those receivers, which do not already maintain a feedback channel. Only those receivers may perform the probabilistic experiment according to the specified probability value. This may be useful in case that a certain preferred threshold $M_{min}$ of reporting receivers is not met and additional receivers should establish feedback channels.

The following table summarizes the different reconfiguration options:

| R | D | Description |
|---|---|---|
| 1 | 0 | Global reconfiguration message; all receivers perform the probabilistic experiment |
| 1 | 1 | Additive reconfiguration message; only receivers without a feedback channel perform the probabilistic experiment |
| 0 | ? | Refresh message; No reconfiguration is performed, only receivers with an established feedback channel to refresh their timer value |

As seen in the sections above, in case an unreliable transport mechanism is used to convey the reporting parameters, same may get lost during transport. This may be in particular true in case RTP packets are transferred over the unreliable UDP protocol. UDP is a transport protocol that provides an unreliable datagram service. It is typically used to unicast/multicast streaming media (like MPEG4) in RTP packets. The corresponding RTCP packets are also transported over UDP.

The BM-SC (acting as a feedback control entity in this embodiment) may also decide to send this information in a more reliable way. It is noted that in the embodiments above the BM-SC has been considered as the source of parameters transmitted to the mobile terminals. However, it is also possible that the feedback control entity providing the content of a multicast or broadcast service (session) may determine and propagate these parameters to the mobile terminals receiving the service.

In the MBMS framework, there are methods to transmit the information in a more reliable way. Terminals may retrieve the session description information (e.g. as SDP description) of an MBMS service using a point-to-point connection to, e.g., a HTTP server or they may receive an SMS comprising this information before joining an MBMS session.

Another possibility may be the use of the FLUTE protocol (see Paila et al., "FLUTE—File Delivery over Unidirectional Transport", draft-ietf-rmt-flute-07.txt, June 2004, incorporated herein by reference and available at http://www.ietf.org). The FLUTE protocol may be used for reliable data transfer in the MBMS architecture. Service announcement information, comprising inter alia the parameters for allowing the mobile terminals to decide whether to provide feedback, may be transmitted using FLUTE and a session description protocol for describing the offered services, e.g. SDP (Session Description Protocol).

Therefore, where reliable transmission of session description as above is available, the reporting information (at least the reporting probability, and possibly additionally the reporting interval and the reporting bandwidth if needed) may be included in that description according to another embodiment of the invention.

Figure 7:
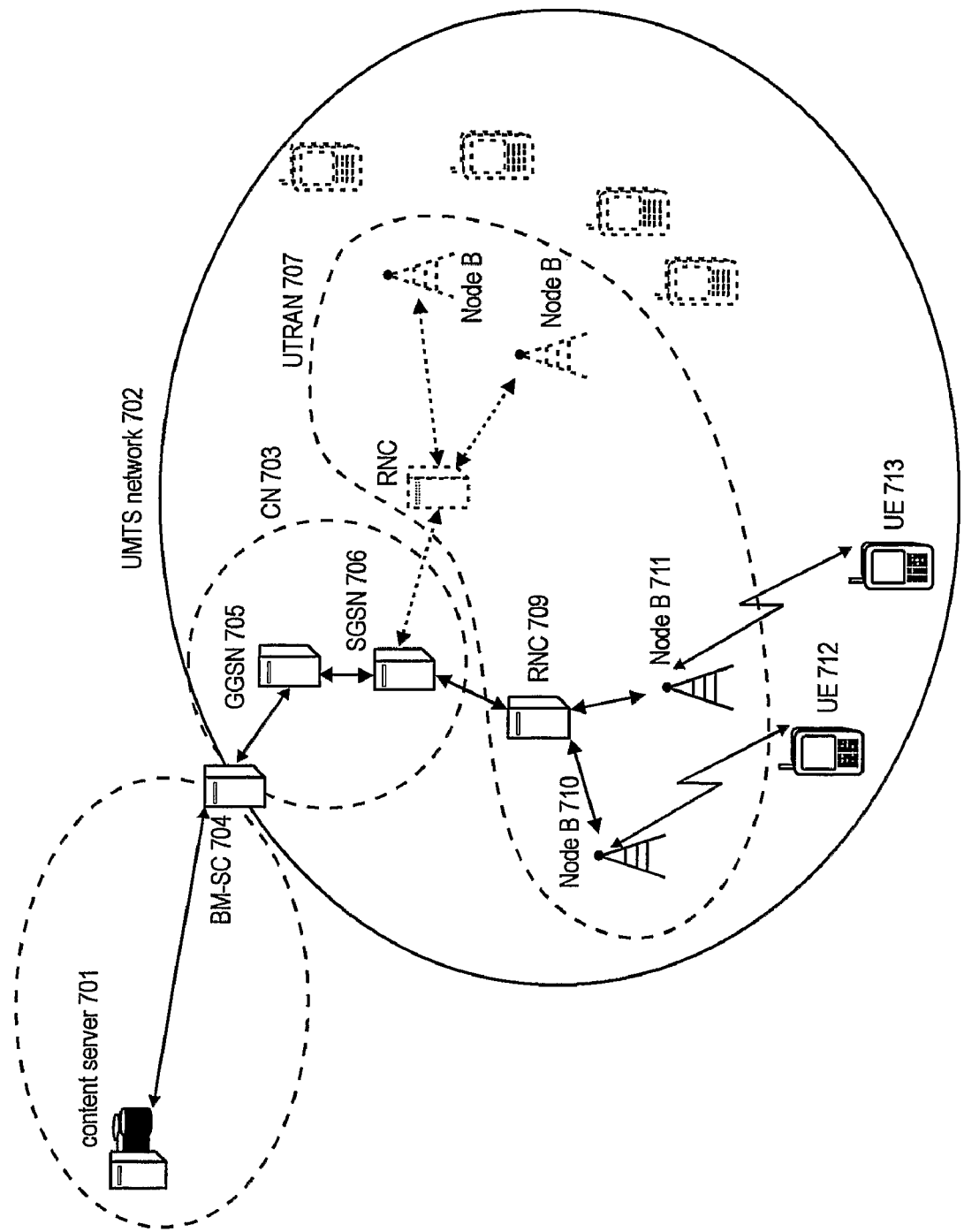
FIGS. 7, 8 & 9 show different scenarios for providing an multicast and broadcast service to users and for controlling the feedback of the receiving terminals according to different embodiments of the invention.
Figure 8:
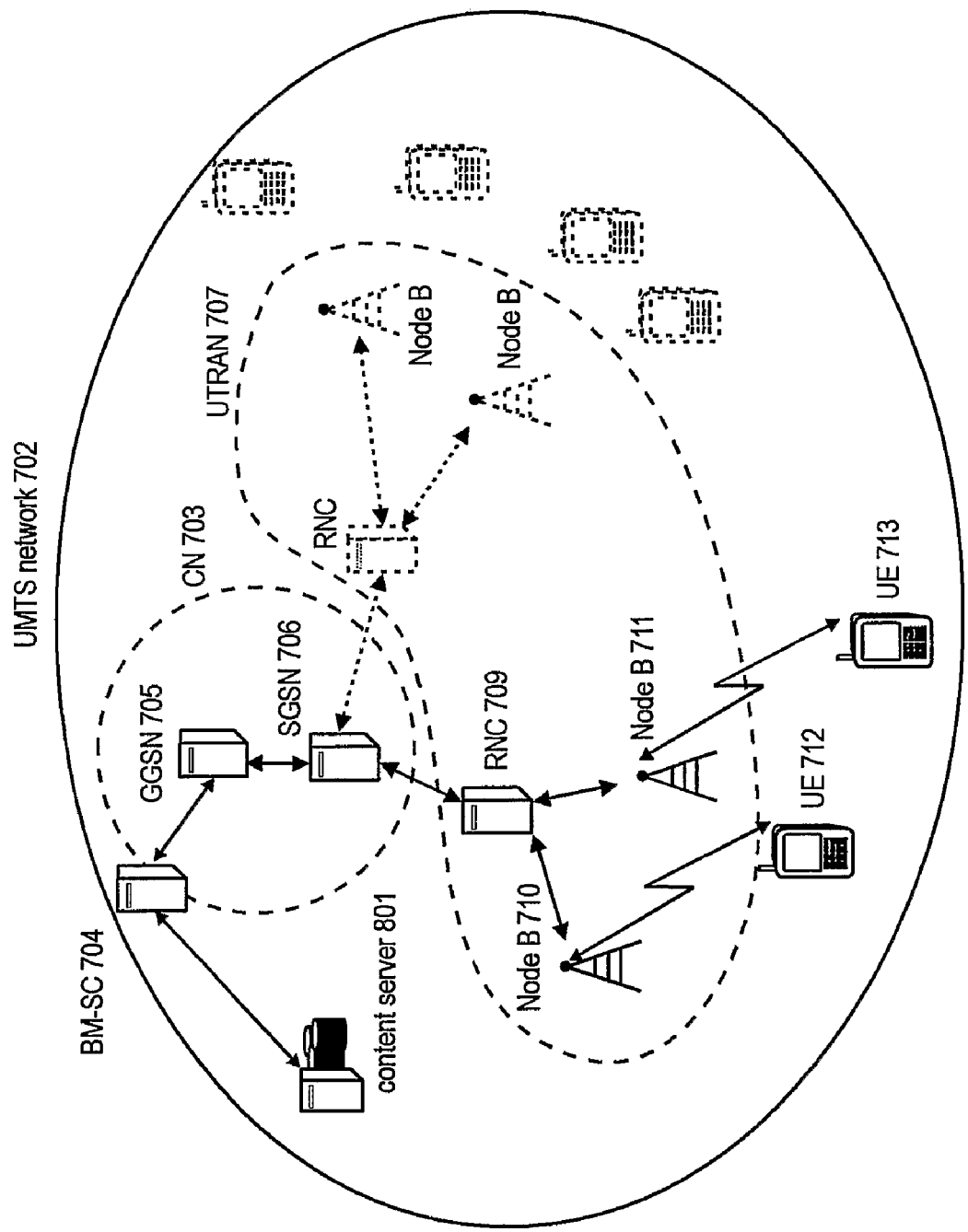
Figure 9:
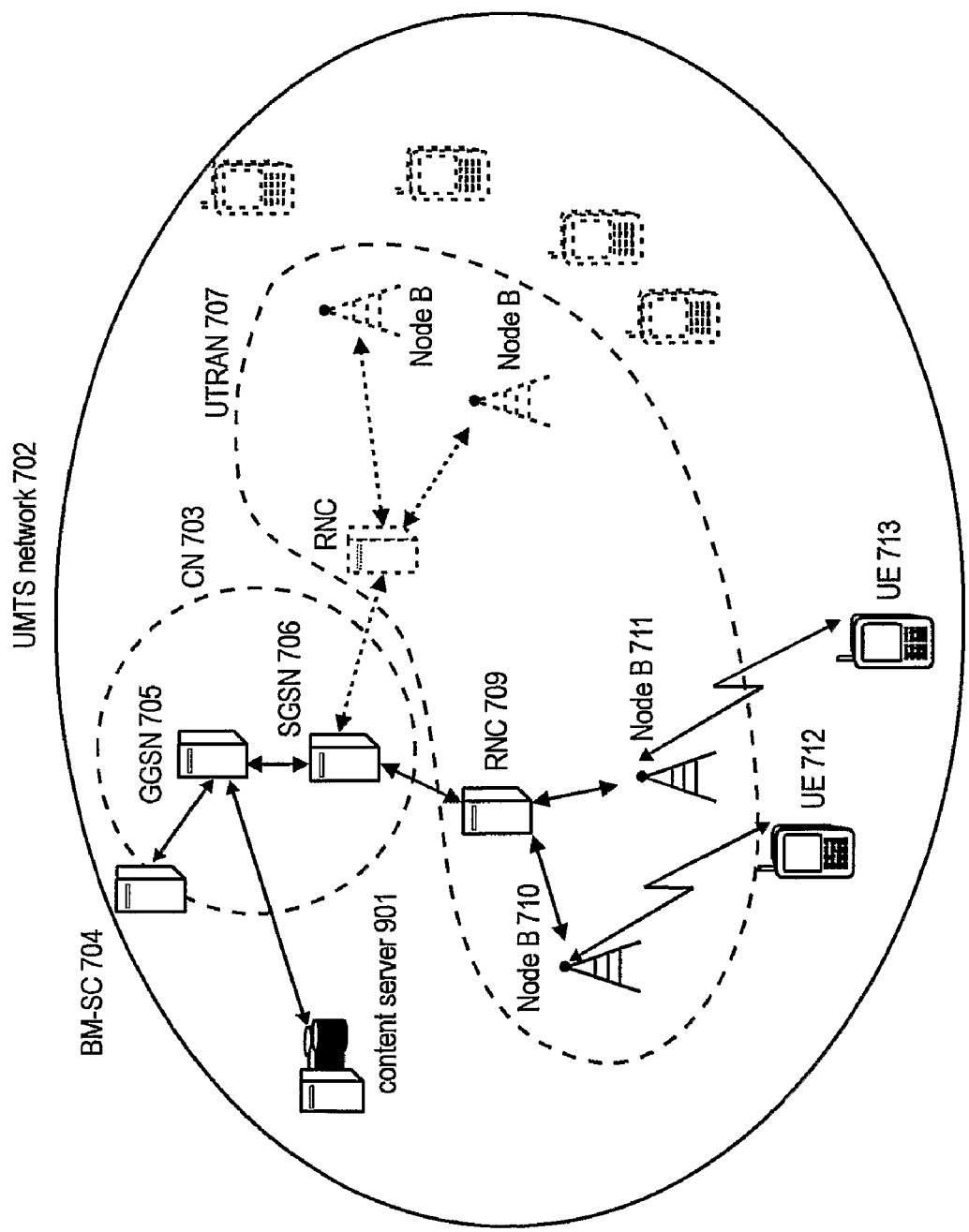

Next, some possible scenarios for providing a multicast or broadcast service to users and capable of employing the invention outlined in the various embodiments above are outlined for exemplary purposes with respect to FIGS. 7, 8 and 9.

In FIG. 7 a content server 701 provides a multicast or broadcast session via a feedback control entity, for example the BM-SC 704, to users for example over an IP-based network. Some of the users receiving the service data may be located in a mobile communication network such as an UMTS network 702, which is considered in the following for exemplary purposes.

According to one embodiment of the invention, the BM-SC 704 located within the UMTS network 702 may control the provision of feedback of service-receiving terminals 712, 713 as outlined above. The BM-SC 704 receives the service data from the content server 701 and may transmit same within an MBMS session to the terminal 712, 713 for example via an GGSN (GPRS Gateway Support Node) 705 and an SGSN (Serving GPRS Support Node) 706 of the CN (core network) 703, at least one RNC 709 and at least one Node B 710, 711. Please note that the BM-SC 704 may also be responsible for announcing the service availability via an announcement channel in the UMTS network 702 and be involved in service admission, i.e. in UEs joining and leaving the service. As outlined previously in reference to one embodiment of the invention, the service announcements may comprise the parameters for feedback control.

Turning now to FIG. 8, an exemplary embodiment of the invention in which the content server 801 is located within the mobile communication system is illustrated. Essentially, the same considerations made for the embodiments of the invention outlined with reference to FIG. 7 above apply here as well, except that employing an IP-based network as shown in FIG. 7 for data provision may not be necessary.

In FIG. 9 an exemplary embodiment of the invention wherein the content server 901 is the source of the data of the multicast or broadcast service is illustrated. In this embodiment of the invention the content server 901 is providing the service related data stream(s) directly to the GGSN 705. According to this embodiment, the GGSN 705 may thus be the network entity which controls feedback provision of the downstream terminals receiving the service. In case the GGSN 705 may directly determine the number of service participants based on the respective information stored in service related context information, such as the MBMS Bearer Context.

In a further embodiment of the invention, the feedback control entity, e.g. the BM-SC may receive the data of the multicast or broadcast service from a multicast or broadcast service provider (content provider 701, 801) as shown in FIGS. 7 and 8.

The feedback control entity may be operated in a non-transparent mode for a multicast or broadcast service provider. This mode will be explained in the following with reference to FIG. 7.

In case, the BM-SC 704 (i.e. the feedback control entity in the exemplary embodiment shown in FIG. 7) acts as a client receiving the multicast or broadcast service from the viewpoint of the content provider 701 (i.e. the multicast or broadcast service provider in the exemplary embodiment shown in FIG. 7). From the terminals' 712, 713 viewpoint, the multicast or broadcast service, the BM-SC 704 acts as a multicast or broadcast server providing the service.

Hence, there may be no end-to-end service session from content server 701 to the mobile terminals 712, 713 but the service provision is split into two end-to-end sessions: one between the terminals 712, 713 and the BM-SC 704 and one between the BM-SC 704 and the content provider 701.

For both sessions different protocols e.g. on the transport and the session layer may be used. For example, the session between BM-SC 704 and the terminals 712, 713 may be using an RTP/UDP/IP (and RTCP feedback) while the session between content provider 701 and BM-SC 704 may use the same protocols or different ones. Hence, the BM-SC 704 may operate in a gateway-like fashion providing protocol translation mechanisms.

Considering now the session between content server 701 and BM-SC 704, the latter may therefore provide feedback to the content provider 701. In order to reflect the reception statistics e.g. the QoS achieved for the different service-receiving terminal 712, 713, the packet loss rate to the individual terminal 712, 713 or the like which are reflected by the feedback received from the terminal 712, 713, the BM-SC 704 may analyze the feedback received and may form an aggregated or cumulative values thereof reflecting the reception statistics of the service within the mobile communication system. This aggregate or the cumulative values may be provided as feedback to the content provider 701 in any form. For example, the BM-SC 704 may generate "standard" RTCP Receiver Reports reflecting the aggregated or cumulative values or a special form of feedback provision may be defined between content provider 701 and BM-SC 704.

A second possibility may be that the BM-SC 704 forwards the received feedback of the individual UEs 712, 713 to the content provider 701. Also in this case the BM-SC 704 may perform some conversion of the feedback data because there is a separate connection/session between the BM-SC 704 and the content provider 701 where even another protocol may be used.

In any case the feedback provision from BM-SC 704 to content provider 701 may be especially feasible for example in case the users get charged for a received service based on the QoS achieved.

Another embodiment of the present invention relates to the implementation of the above described various embodiments using hardware and software. It is recognized that the various above mentioned methods as well as the various logical blocks, modules, circuits described above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the present invention may also be performed or embodied by a combination of these devices.

Further, the various embodiments of the present invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Figure 10:
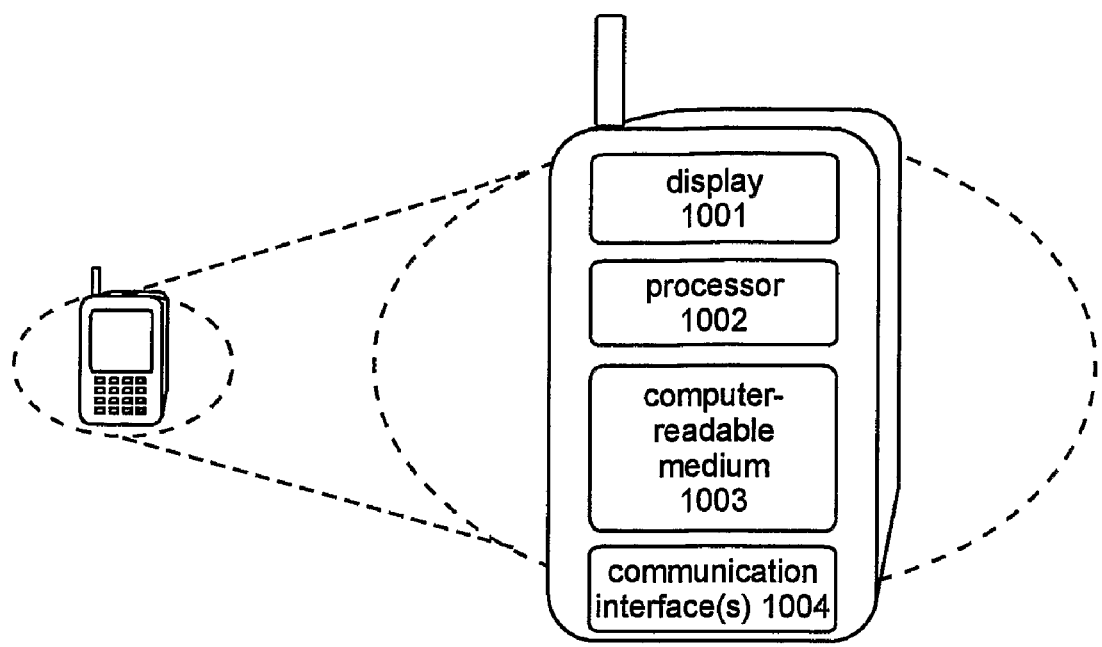
FIGS. 10 & 11 show a mobile terminal and a feedback control entity, respectively, according to different embodiments of the present invention.
Figure 11:
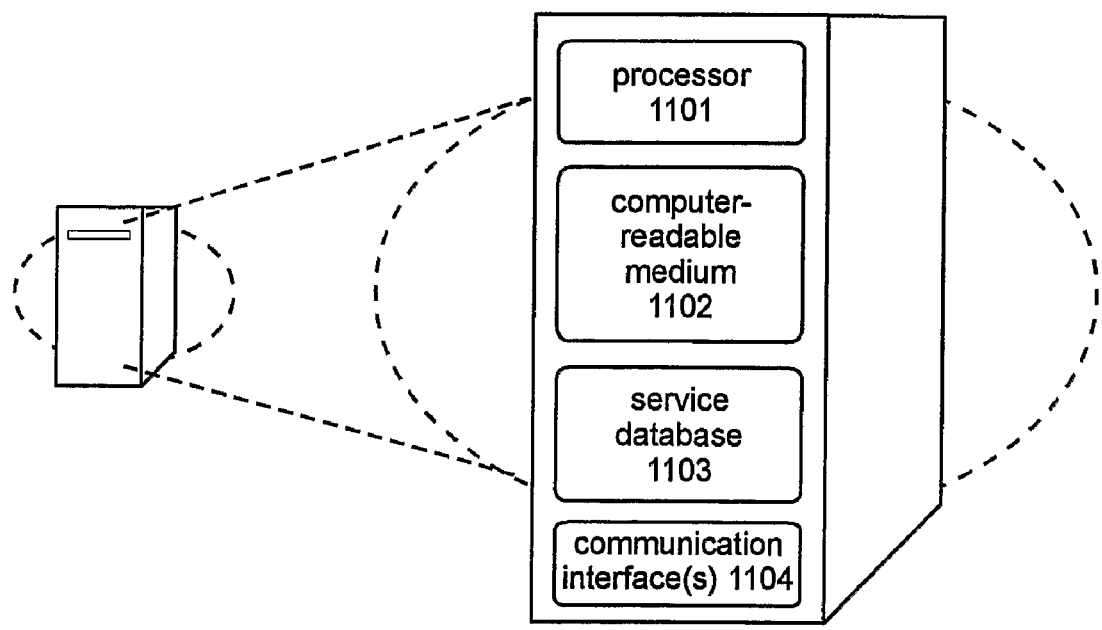

In this respect, FIG. 10 and FIG. 11 show a mobile terminal and a feedback control entity, respectively, according to exemplary embodiments of the invention.

The mobile terminal may inter alia comprise a display 1001 for displaying the data delivered from the feedback control entity as well as at least one communication interface 1004 enabling the reception of the multicast or broadcast session and the transmission of feedback. Further, the mobile terminal may comprise a processor 1002 (computing device), which may be inter alia used to execute instructions stored on the computer-readable storage medium 1003. Further, the processor 1002 may control communications via the communication interface(s) 1004 and may perform the probabilistic experiment to determine at the terminal whether to provide feedback or not, etc.

The feedback control entity shown in FIG. 11 may comprise a processor 1101 a computer readable-storage medium 1102 and at least one communication interface 1104.

The feedback control entity may be the BM-SC of the UMTS network providing or forwarding a multicast or broadcast service. The feedback control entity may further comprise a service database 1103 storing or buffering the service data (e.g. streams) provided by the multicast or broadcast service to the users. Further, the computer-readable medium 1102 may store instructions executable by the processor 1101 and further data.

For example, the data stored in the computer-readable medium 1102 may comprise the context information of the respective service based on which the feedback control entity determine the number of service participants. The instructions stored on the computer-readable medium 1102 may further enable the feedback control entity to control feedback provision from the service participants as outlined in the various embodiments above.

The invention may for example enable configurable and adaptive feedback for multicast or broadcast services provided via an air interface maintaining the end-to-end session concept. Another advantage of the invention could be that it enables configurable and adaptive feedback for MBMS services provided using the RTP protocol.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for controlling the transmission of feedback of mobile terminals receiving via an air interface of a mobile communication system a multicast or broadcast service transmitted or forwarded by a feedback control entity of the mobile communication system, the method being performed by a mobile terminal and comprising:
   receiving the multicast or broadcast service via a unidirectional downlink channel and using an unreliable transport protocol,
   receiving parameters comprising a probability value for a probabilistic experiment based on which the mobile terminal decides whether to provide feedback on reception statistics of the multicast or broadcast service to the feedback control entity,
   deciding whether to provide feedback on the reception statistics of the multicast service or broadcast to the feedback control entity based on the probabilistic experiment using the received probability value, and
   in case it is decided to provide feedback, transmitting the feedback indicating reception statistics of said multicast or broadcast service to the feedback control entity.

2. The method according to claim 1, wherein the probabilistic experiment is a Bernoulli experiment.

3. The method according to claim 1, wherein the parameters are received via a multicast or broadcast data channel providing said multicast or broadcast service.

4. The method according to claim 1, wherein the parameters are received via an announcement channel on which the multicast or broadcast service is announced to potential receivers.

5. The method according to claim 4, wherein a reliable communication protocol is used for data transport on the announcement channel.

6. The method according to claim 1, wherein the parameters received at the mobile terminal further indicate a point in time until which the parameters are valid.

7. The method according to claim 6, further comprising releasing an established bearer for providing session protocol configured feedback in case the point in time indicated by the parameters is reached.

8. The method according to claim 1, further comprising receiving reconfiguration parameters wherein the reconfiguration parameters update the parameters previously received from the feedback control entity.

9. The method according to claim 8, wherein the reconfiguration parameters comprise a flag indicating whether to update a validity period for the parameters previously received and the method further comprising the step of updating the validity period of the previously received parameters based on this flag.

10. The method according to claim 9, wherein the update of the validity period is only performed if the mobile terminal has established a bearer for providing session protocol configured feedback.

11. The method according to claim 8, wherein the received reconfiguration parameters comprise a flag indicating whether a new decision on providing session protocol configured feedback is to be performed by the mobile terminal and further comprising the step of determining based on this flag whether the new decision on providing session protocol configured feedback or not is to be performed by the mobile terminal, and
if so, deciding whether to provide session protocol configured feedback for the multicast or broadcast service to the feedback control entity based on the received reconfiguration parameters,
in case it is decided to provide session protocol configured feedback, establishing a bearer for providing session protocol configured feedback to the feedback control entity, and
transmitting feedback indicating the reception statistics of said multicast or broadcast service to the feedback control entity via said established bearer.

12. The method according to claim 1, wherein the parameters are comprised within a sender report message of an RTCP (Real-time Transport Control Protocol) protocol transmitted by the feedback control entity.

13. The method according to claim 1, wherein the multicast or broadcast service is an MBMS (Multimedia Broadcast/Multicast System) service.

14. The method according to claim 1, wherein the unreliable transport protocol is a UDP (User Datagram Protocol) protocol.

15. The method according to claim 1, wherein the feedback control entity is a Broadcast/Multicast Service Center.

16. The method according to claim 1, wherein the mobile communication network is a UMTS (Universal Mobile Telecommunications System) network.

17. The method according to claim 1, further comprising establishing a bearer for providing the feedback to the feedback control entity in case it is decided to provide the feedback, wherein the feedback is transmitted via the established bearer.

18. A method for controlling by a feedback control entity the transmission of feedback of a plurality of mobile terminals receiving a multicast or broadcast service via an air interface of a mobile communication system, the method comprising the following steps performed by the feedback control entity:
transmitting or forwarding data of the multicast or broadcast service via a unidirectional downlink channel and using an unreliable transport protocol to at least one mobile terminal,
determining parameters, comprising a probability value for a probabilistic experiment, that allow a mobile terminal to decide whether to provide feedback on reception statistics of the multicast or broadcast service to the feedback control entity,
transmitting said parameters to at least a subset of said plurality of mobile terminals receiving the multicast or broadcast service, and
receiving feedback on reception statistics of the multicast or broadcast service from a subset of said plurality of mobile terminals having received said parameters.

19. The method according to claim 18, wherein the parameters are determined based on state information of the multicast and broadcast service maintained by the feedback control entity or received from a network entity of the mobile communication system.

20. The method according to claim 19, wherein the parameters are transmitted via an announcement channel on which the multicast or broadcast service is announced to potential receivers.

21. The method according to claim 20, wherein a reliable communication protocol is used for data transport on the announcement channel.

22. The method according to claim 19, further comprising the step of determining the probability value based on the number of participants of the multicast or broadcast service.

23. The method according to claim 22, further comprising the step of obtaining the number of participants of the multicast or broadcast service from the state information maintained or received by the feedback control entity.

24. The method according to claim 23, wherein the state information of the multicast or broadcast service is comprised within an MBMS (Multimedia Broadcast/Multicast System) UE (User Equipment) Context or an MBMS Bearer Context maintained at the feedback control entity.

25. The method according to claim 23, further comprising the step of receiving the state information of the multicast or broadcast service from a network entity of the mobile communication network maintaining an MBMS (Multimedia Broadcast/Multicast System) UE (User Equipment) Context or an MBMS Bearer Context.

26. The method according to claim 18, wherein the parameters further indicate a point in time until which the parameters are valid.

27. The method according to claim 18, further comprising the step of receiving the data of the multicast or broadcast service from a multicast or broadcast service provider.

28. The method according to claim 27, further comprising the step of forwarding the reception statistics feedback received at the feedback entity to the multicast or broadcast service provider.

29. The method according to claim 28, wherein the feedback for the multicast service is transported to the feedback control entity using a transport protocol and a session protocol, and the method further comprising the step of translating at least one of the transport protocol and the session protocol to another transport protocol or session protocol, respectively, before forwarding the feedback to the multicast or broadcast service provider.

30. The method according to claim 27, wherein the data of the multicast service is transported to the feedback control entity using a transport protocol and a session protocol, and the method further comprising the step of translating at least one of the transport protocol and the session protocol to another transport protocol or session protocol, respectively, before transmitting or forwarding the data of the multicast or broadcast service to the mobile terminals.

31. The method according to claim 27, further comprising the steps of forming an aggregate of the reception statistics feedback received at the feedback control entity and
transmitting said aggregate of the reception statistics feedback to the multicast or broadcast service provider.

32. The method according to claim 18, wherein the multicast or broadcast service is provided using an RTP (Real-time Transport Protocol) protocol and the feedback is provided using an RTCP (Real-time Transport Control Protocol) protocol, wherein a fraction of the available bandwidth for a session providing the multicast or broadcast service is allocated to RTCP protocol messages.

33. The method according to claim 32, wherein the feedback is provided in form of receiver reports of the RTCP protocol.

34. The method according to claim 32, wherein the parameters further indicate a report time interval and the available bandwidth for providing the reception statistics feedback using the RTCP (Real-time Transport Control Protocol) protocol.

35. A mobile terminal receiving via an air interface of a mobile communication system a multicast or broadcast service transmitted or forwarded by a feedback control entity, the mobile terminal comprising:
a receiver configured to receive the multicast or broadcast service via a unidirectional downlink channel and using an unreliable transport protocol,
wherein the receiver is configured to further receive parameters comprising a probability value for a probabilistic experiment based on which the mobile terminal decides whether to provide feedback on reception statistics of the multicast or broadcast service to the feedback control entity,
a processor configured to decide whether to provide the feedback on the reception statistics of the multicast or broadcast service to the feedback control entity based on the probabilistic experiment using the received probability value, the processor being further configured to perform the probabilistic experiment using the received probability value, and
a transmitter configured to transmit the feedback indicating the reception statistics of said multicast or broadcast service to the feedback control entity.

36. A feedback control entity for controlling the transmission of feedback of a plurality of mobile terminals receiving a multicast or broadcast service transmitted or forwarded by a feedback control entity via an air interface of a mobile communication system, the feedback control entity comprising:
a transmitter configured to transmit or forward data of the multicast or broadcast service to at least one mobile terminal via a unidirectional downlink channel,
a processor configured to determine parameters, comprising a probability value for a probabilistic experiment, that allow a mobile terminal to decide whether to provide feedback on reception statistics of the multicast or broadcast service to the feedback control entity,
wherein the transmitter is configured to transmit said parameters to at least a subset of said plurality of mobile terminals receiving the multicast or broadcast service, and
a receiver for receiving the feedback on the reception statistics of the multicast or broadcast service from a subset of said plurality of mobile terminals having received said parameters.

37. A mobile communication system comprising a feedback entity according to claim 36 and at least one mobile terminal for receiving via an air interface of the mobile communication system a multicast or broadcast service transmitted or forwarded by a feedback control entity, the mobile terminal comprising:
a receiver configured to receive the multicast or broadcast service via a unidirectional downlink channel and using an unreliable transport protocol and a session protocol, wherein the session protocol configures a feedback provision of terminals receiving the multicast or broadcast service,
wherein the receiver is configured to further receive parameters based on which the mobile terminal decides whether to provide session protocol configured feedback to the feedback control entity,
a processor configured to decide whether to provide the session protocol configured feedback for the multicast or broadcast service to the feedback control entity based on the received parameters and for establishing a bearer for providing the session protocol configured feedback to the feedback control entity, in ease it is decided to provide the session protocol configured feedback, and
a transmitter configured to transmit the session protocol configured feedback indicating reception statistics of said multicast or broadcast service to the feedback control entity via said established bearer.

38. A computer-readable medium for storing instructions that, when executed by a processor of a mobile terminal, cause the processor to control the transmission of feedback of said mobile terminal receiving via an air interface of a mobile communication system a multicast or broadcast service transmitted or forwarded by a feedback control entity by:
receiving at the mobile terminal the multicast or broadcast service via a unidirectional downlink channel using an unreliable transport protocol,
receiving at the mobile terminal parameters comprising a probability value for a probabilistic experiment based on which the mobile terminal decides whether to provide session protocol configured feedback on reception statistics of the multicast or broadcast service to the feedback control entity,
deciding by the mobile terminal whether to provide the feedback on reception statistics of the multicast service or broadcast to the feedback control entity based on the probabilistic experiment using the probability value,
in case it is decided to provide the feedback, transmitting the feedback indicating reception statistics of said multicast or broadcast service from the mobile terminal to the feedback control entity.

39. A computer-readable medium for storing instructions that, when executed by a processor of a feedback control entity, cause the processor to control the transmission of feedback of mobile terminals receiving via an air interface of a mobile communication system a multicast or broadcast service transmitted or forwarded by the feedback control entity by:

transmitting or forwarding data of the multicast or broadcast service from the feedback control entity to at least one mobile terminal via a unidirectional downlink channel, determining at the feedback control entity parameters, comprising a probability value for a probabilistic experiment, that allow a mobile terminal to decide whether to provide feedback on reception statistics of the multicast or broadcast service to the feedback control entity, transmitting said parameters from the feedback control entity to at least a subset of said plurality of mobile terminals receiving the multicast or broadcast service, and receiving at the feedback control entity the feedback on reception statistics of the multicast or broadcast service from a subset of said plurality of mobile terminals having received said parameters.

\* \* \* \* \*